3,060,543
METHOD OF MANUFACTURING COMPOSITE REFRACTORY OBJECTS

Clifford Shaw, London, England, assignor to Zironal Processes Ltd., Port Washington, N.Y., a corporation of New York
No Drawing. Original application Nov. 19, 1956, Ser. No. 622,796. Divided and this application Apr. 13, 1960, Ser. No. 21,864
9 Claims. (Cl. 25—156)

This invention relates to refractory objects produced by mixing silicon carbide (Carborundum), zircon or mixtures or zirconia and alumina with a lower alkyl silicate, such as an ethyl silicate binder and water, allowing the mixture to set by hydrolysis and gelling of the binder and then firing. In particular it is directed to such objects wherein the refractory aforesaid is a facing on a backing of another refractory, suitably an insulating refractory; and the method of manufacturing the same.

Refractory objects produced as above described are valuable for such purposes as furnace and crucible linings, moulds for high melting point metals and refractory tiles. Silicon carbide has advantages over other refractory materials in that apart from its high temperature properties it presents an excellent surface for contact with, for example, heated ferrous billets because the latter do not adhere to the silicon carbide surface. On the other hand silicon carbide has only poor heat insulating properties and on this account and because of its high cost it is desirable to use these silicon carbide compositions as a facing on a backing of known refractory material such as sillimanite, fire clay grog, or other forms of aluminum silicate having good heat insulating properties.

Similarly in the case of the other materials mentioned above, such as zircon or mixtures of zirconia and alumina, there are various reasons, as for example, matters of cost which make it desirable to use such other materials in the form of a facing on a backing of inferior quality material from the refractory point of view. There is a difficulty, however, in making refractory objects with a facing of different material to the main (the backing) body without producing a line of cleavage between the two refractory compositions, with consequent cracking and peeling off of the surface lining.

It has now been found that if a separate slurry is made of each of the two different refractories with the alkyl silicate binder and water together with a mutual solvent such as ethyl alcohol or isopropyl alcohol, or other suitable solvent as is well known in the art and an organic amine such as piperidine, triethylamine, cyclohexylamine, ethanolamine, diethanolamine and triethanolamine is added as a gelling agent in different proportions, one of the mixes may be caused to set in a shorter period of time than the other. Thus, if the backing layer of e.g. sillimanite slurry is caused to set quicker than the facing layer of Carborundum slurry, and the Carborundum slurry is filled into e.g. a brick mould first, to form the facing, there will be time to fill in the quicker setting sillimanite slurry before Carborundum slurry has completely set if the proportions of gelling agent are suitably chosen so that there will be a certain amount of diffusion of the facing layer into the backing layer and vice versa.

It has been shown in United States patent specifications Nos. 2,550,923 and 2,660,538 that organic bases such as piperidine, triethylamine, dicyclohexylamine and triethanolamine act as accelerating gelling agents and when employed in proportions of 1–5% by weight of the ethyl silicate the rate of gelling is proportional to the amount of the amine accelerator. In this way it is possible by adjusting the proportion of gelling agent in the two mixes to arrange that the mix which is first laid out will take that much longer to set as is taken up in laying the second layer so that both layers will set more or less simultaneously but in between the two layers there will be a transition zone due to the diffusion of the first layer into the second layer, brought about by vibrating the mass during gellation with consequent migration of the acid particles of each layer into the adjacent layer, so that the rate of setting of the transition zone will be gradually prolonged from the lower part of the surfacing layer to the upper part of the backing layer and no line of cleavage will be formed.

According to the present invention a method of producing refractory materials having a facing layer consisting of a different refractory material from that of the backing layer comprises laying a layer consisting of a slurry of one of the refractory materials and superimposing thereon a layer consisting of a slurry of the other refractory material, each of said slurries being made with ethyl silicate, water, and a mutual solvent wherein there is incorporated in each of the slurries before laying, an organic base gelling accelerator and the proportion of accelerator in each slurry is adjusted so that the slurry to be first applied has a longer setting time than that to be later applied, vibrating the mass and thereafter when the composite material has set firing it.

According to an important feature of the present invention, a method of forming refractory materials with a facing layer of silicon carbide and a backing layer of a heat insulating refractory comprises making a separate slurry with ethyl silicate, water and a mutual solvent as a binder of each of the refractories, incorporating with each slurry an organic amine to accelerate the gelling of the binder and adjusting the amount of the gelling accelerator in each slurry so that the slurry for the backing layer will set before that for the facing layer, laying the facing layer first and when the composite material has set firing it.

The gelling time may be adjusted, inter alia, as follows: Where the proportion of alkyl silicate to a mixture of mutual solvent and water is constant, the setting time may be varied in two ways. Thus, when using a mixture in which the ratio of water-to-solvent in the water-solvent mixture is constant, the concentration of the accelerator included in the alkyl silicate (as the carrier of the accelerator) is varied. When the concentration of the accelerator in the alkyl silicate is constant, then the ratio of water-to-solvent in the water-solvent mixture is varied.

When producing tiles by the process above described a further minor problem is met in that there is a difference in contraction during firing between one refractory mix e.g. the silicon carbide mix and the other refractory forming the backing layer and in the production of a comparatively thin tile this will result in the warping of the tile.

A small modification of the process hereinbefore described enables the solution of this problem to be effected in that a backing layer of double the required thickness is faced on both sides with the Carborundum mix as aforesaid so that the contraction force tending to cause warping will be neutralized and thereafter the double faced tile produced by the general technique as aforesaid may be cut in two along the plane parallel to the two surface layers.

According to this modification a layer to form the facing is first laid and a layer to form the foundation is laid on the top thereof and finally another facing layer is formed on the top of the foundation layer, wherein the proportions of the gelling accelerators in each are adjusted so that the respective layers will set at approximately the same time and after setting the double faced tile is cut into two along the plane parallel to the two surface layers.

The following examples illustrate the manner in which the invention may be carried into effect:

*Example 1*

In order to prepare a sillimanite furnace wall brick, e.g. 6" x 6" x 2" with a 1" thickness of a silicon carbide facing, the cubic capacity of each portion of the brick is ascertained and the necessary amount of the material forming each measured out. Separate slurries are made of each material with the binder in the form of ethyl silicate (40% $SiO_2$ content) and into each the necessary amount of accelerator, in this case dicyclohexylamine, is added and gelling is brought about by the further addition of water through the medium of methylated spirit containing water the concentration of which can be varied to give suitable working gelation time. Thus:

(A) Material for the facing:
| | |
|---|---|
| Silicon carbide _____lbs__ | 3.5 |
| Binder (ethylsilicate—40% $SiO_2$ content— containing 1.5% of the accelerator)__ccs__ | 157.5 |
| Solvent-water mixture (15% water and 85% of ethanol containing methanol as denaturant) _____ccs__ | 32.0 |

(B) Material for the backing:
| | |
|---|---|
| Sillimanite _____lbs__ | 5.5 |
| Binder (as above) _____ccs__ | 297.0 |
| Solvent-water mixture (20% water and 80% of ethanol containing methanol as denaturant) _____ccs__ | 59.00 |

Slurries made of each batch of the above materials are then poured separately, first the facing layer and second the backing layer, under vibration into the mould and allowed to gel. The green brick is then allowed suitable air drying, preparatory to baking at approximately 200–400° C., thus allowing the removal of alcohol vapours and completion of the hydrolysis.

The finished brick is then heated in a muffle furnace to a temperature of approximately 1450–1500° C. although the actual temperature used may be varied according to the material used.

*Example 2*

In exactly the same way as in Example 1 a sillimanite brick 6" x 6" x 2", weighing 5½ lbs. is faced with a 6" x 6" zircon face of 1" thickness, the only difference being the proportions used for forming the zircon face which were as follows:

| | |
|---|---|
| Zircon _____lbs__ | 4 |
| Binder (as in Example 1) _____ccs__ | 160 |
| Solvent-water mixture (as in B of Example 1) _____ccs__ | 32 |

In making a double faced tile for subsequent cutting into two single faced tiles, as aforesaid mentioned, are in making double faced brick for use as such, the principle and technique is in accordance with the foregoing, except that the setting time of each layer is suitably adjusted as to the concentration of the accelerator present in each slurry, so that the layers will set at the same time.

*Example 3*

A sillimanite furnace wall brick with a silicon carbide facing as in Example 1 is made by the general method described therein, except that in B the binder contains 1.8% of the accelerator while the proportion of water to solvent in solvent-water mixture is used in the constant ratio of 15% : 85% as in A.

This application is a division of my pending application Serial No. 622,796, filed November 19, 1956.

It will be understood that the foregoing description of the invention and the examples set forth are merely illustrative of the principles thereof. Accordingly, the appended claims are to be construed as defining the invention within the full spirit and scope thereof.

What I claim is:

1. Method of producing refractory objects comprising a backing and a facing wherein the facing consists essentially of a refractory material different from the refractory material of the backing which comprises:
   pouring into a container:
   (1) a first slurry comprising refractory particles, a lower alkyl silicate, water, mutual solvent and a gelling accelerator;
   (2) on top of the first poured slurry, a second slurry comprising refractory particles different from those of the first slurry, a lower alkyl silicate, water, mutual solvent and a gelling accelerator;
   the proportions of water, mutual solvent and gelling accelerator being adjusted so that the gelling time of the first slurry is longer than the gelling time of the second slurry, vibrating the mass during gelation thereby to effect migration of refractory particles from each poured layer into the adjacent layer whereby the rate of setting of the zone of transition between said layers will be gradually prolonged from the lower part of the layer developed from the first pouring to the upper part of the layer developed from the second pouring, and when the composite object is set, firing it.

2. Method of producing refractory objects comprising a backing and a facing wherein the facing consists essentially of a refractory material different from the refractory material of the backing which comprises:
   pouring into a container:
   (1) a first slurry comprising essentially silicon carbide particles, a lower alkyl silicate, water, mutual solvent and an amine gelling accelerator;
   (2) on top of the first poured slurry, a second slurry comprising heat insulating refractory particles different from those of the first slurry, a lower alkyl silicate, water, mutual solvent and an amine gelling accelerator;
   the proportions of water, mutual solvent and gelling accelerator being adjusted so that the gelling time of the first slurry is longer than the gelling time of the second slurry, vibrating the mass during gelation thereby to effect migration of refractory particles from each poured layer into the adjacent layer whereby the rate of setting of the zone of transition between said layers will be gradually prolonged from the lower part of the layer developed from the first pouring to the upper part of the layer developed from the second pouring, and when the composite object is set, firing it.

3. Method of producing refractory objects comprising a backing and a facing wherein the facing consists essentially of a refractory material different from the refractory material of the backing which comprises:
   pouring into a container:
   (1) a first slurry comprising refractory particles, a lower alkyl silicate, water, mutual solvent and a gelling accelerator;
   (2) on top of the first poured slurry, a second slurry comprising refractory particles different from those of the first slurry, a lower alkyl silicate, water, mutual solvent and a gelling accelerator;
   (3) on top of the second poured slurry, a third slurry comprising refractory particles as in (1), a lower alkyl silicate, water, mutual solvent and a gelling accelerator;
   the proportions of water, mutual solvent and gelling accelerator in each of said pourings being adjusted so that the gelling time of the first slurry is longer than the gelling time of the second slurry, and the gelling time of the second slurry is longer than the gelling time of the third slurry, vibrating the mass during gelation thereby to effect migration of refractory particles from each poured slurry into the adjacent layer whereby the rate of setting of the zones of transition between said layers will be gradually prolonged from the lower part of the layer developed from the first pouring into the layer developed from the second pouring and gradually prolonged from the upper part of the layer developed from the second pouring to the upper part of the layer developed from the third pouring, and when the composite object is set, firing it.

4. Method in accordance with claim 2, wherein the alkyl silicate is ethyl silicate, the proportion of water to mutual solvent in the first pouring is 15:85 parts, the gelling accelerator is 1.5% of dicyclohexylamine in both pourings, and the proportion of water to alcohol in the second pouring is 20:80 parts.

5. Method in accordance with claim 2, wherein the alkyl silicate is ethyl silicate, the proportions of water and mutual solvent in both pourings are 15:85 parts and the gelling accelerator is dicyclohexylamine in an amount of 1.5% in the first pouring and 1.8% in the second pouring.

6. Method in accordance with claim 1, wherein the refractory in the first pouring is zircon and the refractory in the second pouring is sillimanite.

7. Method in accordance with claim 6, wherein the proportion of water to mutual solvent in both pourings is 15:85 parts and the gelling accelerator is dicyclohexylamine in an amount of 1.5% in the first pouring and 1.8% in the second pouring.

8. Method in accordance with claim 1, wherein the concentration of the accelerator present in each slurry is adjusted so that the pourings will set at the same time.

9. Method in accordance with claim 2, wherein the concentration of the accelerator present in each slurry is adjusted so that the pourings will set at the same time.

References Cited in the file of this patent

UNITED STATES PATENTS

| | | |
|---|---|---|
| 1,308,330 | Brown | July 1, 1919 |
| 1,345,377 | Linbarger | July 6, 1920 |
| 1,459,357 | Booze | June 19, 1923 |
| 1,552,270 | Burke | Sept. 1, 1925 |
| 1,614,926 | Jeppson et al. | Jan. 18, 1927 |
| 1,895,738 | Shugg et al. | Jan. 31, 1933 |
| 2,550,923 | Hackford et al. | May 1, 1951 |
| 2,660,538 | Emblem et al. | Nov. 24, 1953 |
| 2,897, 72 | Hansen | Aug. 4, 1959 |